(12) United States Patent
Kai et al.

(10) Patent No.: US 9,557,027 B2
(45) Date of Patent: Jan. 31, 2017

(54) LIGHTING APPARATUS AND AUTOMOBILE INCLUDING THE SAME

(71) Applicant: Panasonic Intellectual Property Management Co., Ltd., Osaka (JP)

(72) Inventors: Makoto Kai, Kyoto (JP); Yoshihiko Kanayama, Hyogo (JP); Hiro Aoki, Osaka (JP); Tomoyuki Ogata, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/607,557

(22) Filed: Jan. 28, 2015

(65) Prior Publication Data
US 2015/0219303 A1 Aug. 6, 2015

(30) Foreign Application Priority Data

Feb. 3, 2014 (JP) .................................. 2014-018870

(51) Int. Cl.
*F21V 5/00* (2015.01)
*F21S 8/10* (2006.01)
(Continued)

(52) U.S. Cl.
CPC ......... *F21S 48/2237* (2013.01); *B60Q 1/0052* (2013.01); *B60Q 1/20* (2013.01);
(Continued)

(58) Field of Classification Search
CPC F21S 48/2237; F21S 48/1241; F21S 48/2262; F21S 48/2281; F21S 48/225; F21S 38/215; F21S 38/2243; F21V 5/007; B60Q 1/0052; B60Q 1/20; G02B 6/0048; G02B 6/002
(Continued)

(56) References Cited

U.S. PATENT DOCUMENTS 6,367,950 B1 * 4/2002 Yamada ................ F21S 48/215
362/241
6,443,594 B1 * 9/2002 Marshall ................ F21V 5/007
362/236
(Continued)

FOREIGN PATENT DOCUMENTS

| CN | 1795116 A | 6/2006 |
|---|---|---|
| DE | 20 2013 007 190 U1 | 8/2013 |
| JP | 2005-193892 | 7/2005 |

OTHER PUBLICATIONS

Chinese First Office Action and Search Report dated Sep. 18, 2016 for corresponding Chinese Application No. 201510046494.1.

*Primary Examiner* — Bryon T Gyllstrom
(74) *Attorney, Agent, or Firm* — Renner, Otto, Boisselle & Sklar, LLP (57) ABSTRACT

A lighting apparatus includes: a light guide which is tubular and includes a light entry portion in one end in a tube axis direction; and a light source arranged corresponding to the light entry portion. The light entry portion includes a light redirecting portion which changes a traveling direction of light entering from the first light source to a direction that is substantially parallel to the tube axis direction of the light guide. The light guide includes: plural light-emitting faces which are ring-shaped and formed concentrically in the other end in the tube axis direction of the light guide; and a non light-emitting face which is wall-like and formed along the tube axis direction of the light guide, at a border of adjacent ones of the light-emitting faces.

11 Claims, 9 Drawing Sheets

(51) Int. Cl.
*B60Q 1/00* (2006.01)
*B60Q 1/20* (2006.01)
*F21V 8/00* (2006.01)

(52) U.S. Cl.
CPC ......... *F21S 48/1241* (2013.01); *F21S 48/215* (2013.01); *F21S 48/2243* (2013.01); *F21S 48/2262* (2013.01); *F21S 48/2281* (2013.01); *G02B 6/002* (2013.01); *B60Q 2400/30* (2013.01); *G02B 6/0048* (2013.01)

(58) Field of Classification Search
USPC .......................................................... 362/520
See application file for complete search history.

(56) References Cited

U.S. PATENT DOCUMENTS

| | | | |
|---|---|---|---|
| 6,739,738 B1 * | 5/2004 | Smith ................... | F21S 48/215 362/235 |
| 7,452,114 B2 | 11/2008 | Gasquet | |
| 2002/0181231 A1 * | 12/2002 | Luk ......................... | F21V 5/008 362/240 |
| 2003/0053310 A1 * | 3/2003 | Sommers ................ | F21V 5/006 362/231 |
| 2004/0218399 A1 * | 11/2004 | Lin ....................... | B60Q 1/0052 362/509 |
| 2005/0141213 A1 | 6/2005 | Gasquet | |
| 2005/0152141 A1 * | 7/2005 | Suzuki ................. | B60Q 1/0052 362/241 |
| 2005/0152153 A1 * | 7/2005 | Amano ................. | F21S 48/215 362/520 |
| 2006/0007692 A1 * | 1/2006 | Hsien .................... | B60Q 1/263 362/382 |
| 2006/0062012 A1 * | 3/2006 | Tsai ..................... | B60Q 1/0052 362/520 |
| 2008/0310159 A1 * | 12/2008 | Chinniah ............. | F21S 48/1154 362/244 |
| 2010/0259153 A1 | 10/2010 | Futami | |
| 2012/0147619 A1 * | 6/2012 | Tsai ......................... | F21V 5/04 362/520 |
| 2013/0141932 A1 * | 6/2013 | Brown ................ | F21S 48/1225 362/520 |

* cited by examiner

LIGHTING APPARATUS AND AUTOMOBILE INCLUDING THE SAME

CROSS REFERENCE TO RELATED APPLICATION

This application claims the benefit of priority of Japanese Patent Application Number 2014-018870, filed Feb. 3, 2014, the entire content of which is hereby incorporated by reference.

TECHNICAL FIELD

The present disclosure relates to a lighting apparatus and an automobile including the lighting apparatus.

BACKGROUND ART

Lighting apparatuses are used at the front or back of vehicles such as an automobile. In recent years, drivers of automobiles have been making the presence of their automobile known to pedestrians or drivers of other automobiles by turning ON lighting apparatuses even in the daytime.

This type of lighting apparatus includes, for example, a tubular light guide, one end (a first end) of which is a light entry side and the other end (a second end) is a light exit side, and light sources arranged in the first end of the light guide. Here, concentric, circular light-emitting faces are formed having different levels, in the second end of the light guide (for example, see Japanese Unexamined Patent Application Publication No. 2005-193892).

In such a lighting apparatus, light from the light sources is made to enter the light guide to cause the light-emitting faces and vertical wall faces, which make up the difference in level between the light-emitting faces, to emit light. With this, the front of the automobile can be illuminated with a round light, for example, and the driver is able to make the presence of his automobile known to pedestrians and drivers of other automobiles.

SUMMARY

A simple round light attracts people's attention temporarily but becomes less noticeable as time passes. As a result, the level of safety deteriorates.

An object of the present disclosure is to provide a lighting apparatus and an automobile that are capable of creating a heightened awareness of its presence.

In order to achieve the aforementioned object, a lighting apparatus according to an aspect of the present invention includes: a light guide which is tubular and includes a light entry portion in one end in a tube axis direction; and a first light source arranged corresponding to the light entry portion, wherein the light entry portion includes a light redirecting portion which changes a traveling direction of light entering from the first light source to a direction that is substantially parallel to the tube axis direction of the light guide, and the light guide includes: a plurality of light-emitting faces which are ring-shaped and formed concentrically in an other end in the tube axis direction of the light guide; and a non light-emitting face which is wall-like and formed along the tube axis direction of the light guide, at a border of adjacent ones of the plurality of light-emitting faces.

Accordingly, it is possible to create a heightened awareness of the presence of the lighting apparatus. Therefore, when the lighting apparatus is used in an automobile, it is possible to create a heightened awareness of the presence of the automobile among pedestrians or drivers of other automobiles, and thus the level of safety can be raised.

BRIEF DESCRIPTION OF THE DRAWINGS

The figures depict one or more implementations in accordance with the present teaching, by way of examples only, not by way of limitations. In the figures, like reference numerals refer to the same or similar elements.

DETAILED DESCRIPTION

Hereinafter, exemplary embodiments of the present invention will be described in detail with reference to the drawings. It should be noted that each of the subsequently-described embodiments show a specific preferred example of the present invention. Therefore, numerical values, shapes, materials, structural components, the arrangement and connection of the structural components, etc. shown in the following exemplary embodiments are mere examples, and are not intended to limit the scope of the present invention. Furthermore, among the structural components in the following exemplary embodiments, components not recited in any one of the independent claims which indicate the broadest concepts of the present invention are described as arbitrary structural components.

It should be noted that the respective figures are schematic diagrams and are not necessarily precise illustrations. Furthermore, in the respective figures, substantially identical components are assigned the same reference signs, and overlapping description is omitted or simplified.

Embodiment 1

Figure 1:
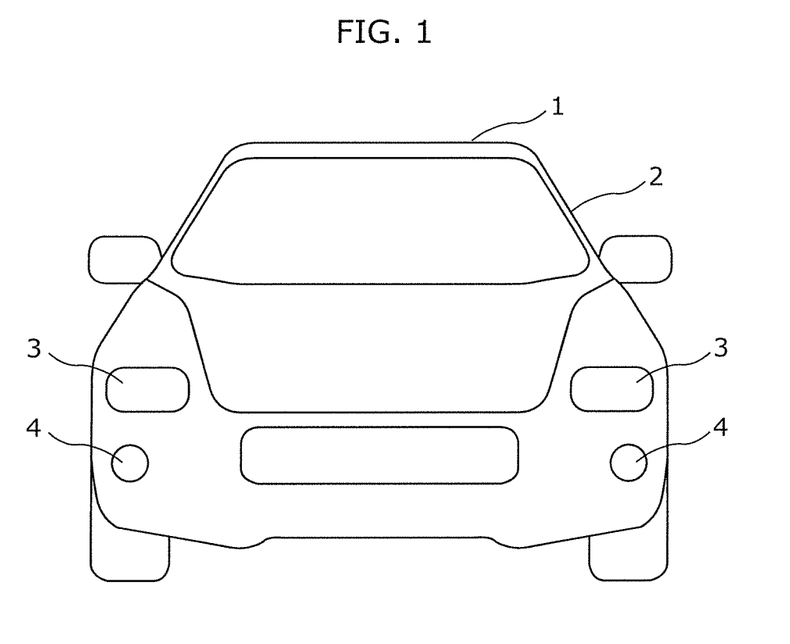
FIG. 1 is a front view of an automobile according to Embodiment 1.

First, an automobile 1 according to this embodiment will be described using FIG. 1. FIG. 1 is a front view of an automobile according to Embodiment 1.

As illustrated in FIG. 1, the automobile 1 according to this embodiment is equipped with lighting apparatuses 4. Specifically, the automobile 1 is an example of a vehicle such as a four-wheeled automobile, and includes a vehicle body 2, a pair of headlights 3 disposed at the upper portion of the left and right sides of the front of the vehicle body 2, and a pair of the lighting apparatuses 4 disposed at the lower portion of the left and right sides of the front of the vehicle body 2.

Each of the lighting apparatuses 4 is a fog lamp or a daylight running lamp/daylight running light (DRL), and can be turned ON not only at night but also in the daytime. It should be noted that the lighting apparatus 4 is not limited to a fog lamp or a DRL.

Figure 2:
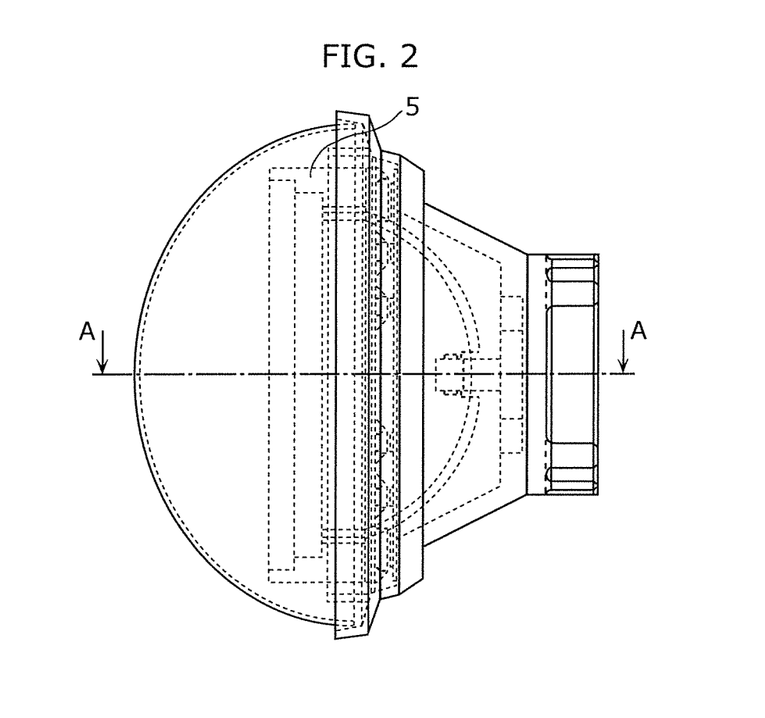
FIG. 2 is a side view of a lighting apparatus according to Embodiment 1.
Figure 3:
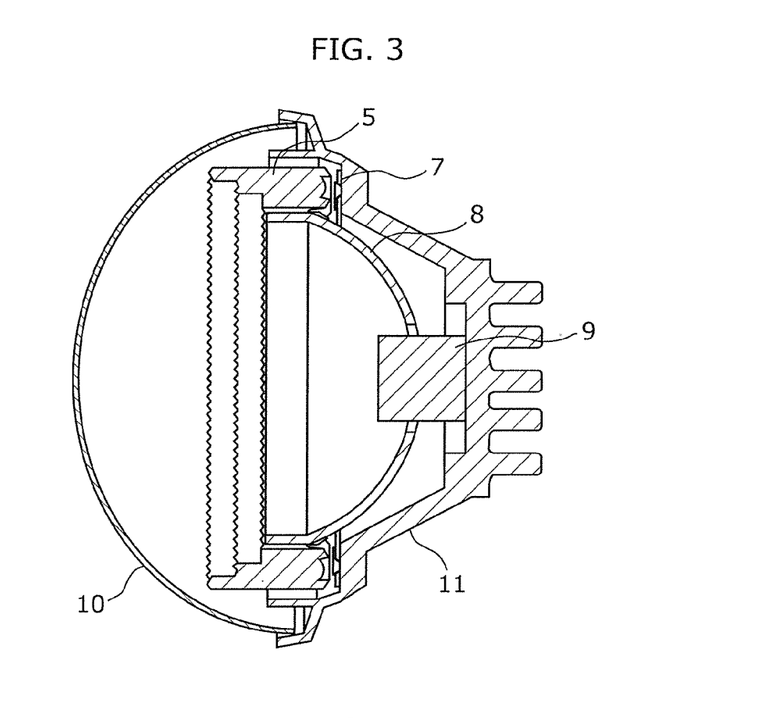
FIG. 3 is a cross-sectional view of the lighting apparatus according to Embodiment 1 at line A-A in FIG. 2.

The specific configuration of the lighting apparatus 4 will be described using FIG. 2 to FIG. 4. FIG. 2 is a side view of the lighting apparatus according to Embodiment 1; FIG. 3 is a cross-sectional view of the lighting apparatus at line A-A in FIG. 2; and FIG. 4 is an exploded side view of the lighting apparatus.

Figure 4:
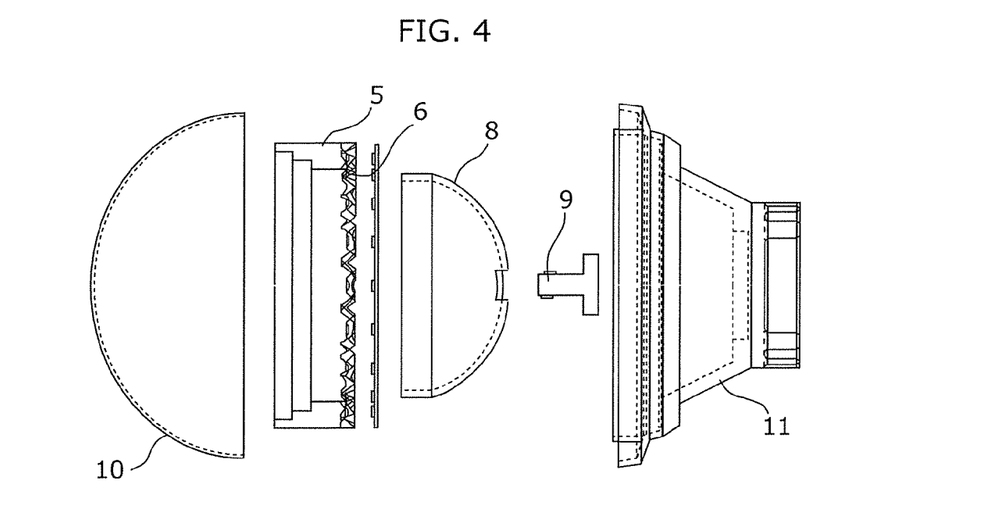
FIG. 4 is an exploded side view of the lighting apparatus according to Embodiment 1.

As illustrated in FIG. 2 to FIG. 4, the lighting apparatus 4 includes a tubular light guide 5 having light entry portions 6 in one end (a first end) in the tube axis direction, and light sources 7 (first light sources) arranged corresponding to the light entry portions 6.

The lighting apparatus 4 further includes a cup-shaped reflecting mirror 8 disposed inward of the light guide 5, and a light source 9 (second light source) disposed at a center portion of the reflecting mirror 8.

The lighting apparatus 4 according to this embodiment further includes a cover 10 covering the forward outer periphery at the other end (a second end) of the light guide 5, and a case 11 covering the backward outer periphery at the first end of the light guide 5.

In the lighting apparatus 4 configured in the above manner, the light source 9 is turned ON at night, etc. In this case, the light from light source 9 is concentrated in the central-axis direction by the cup-shaped reflecting mirror 8 so as to be emitted to a distance. Specifically, the light source 9 is a lighting means for illuminating the front of the automobile 1 to allow the driver of the automobile 1 to recognize other automobiles, pedestrians, the road surface, etc.

In contrast, the light sources 7 are turned ON not only at night but also in the daytime. Specifically, the light sources 7 are provided in order to create a heightened awareness of the presence of the automobile 1 among pedestrians and drivers of other automobiles.

Figure 5:
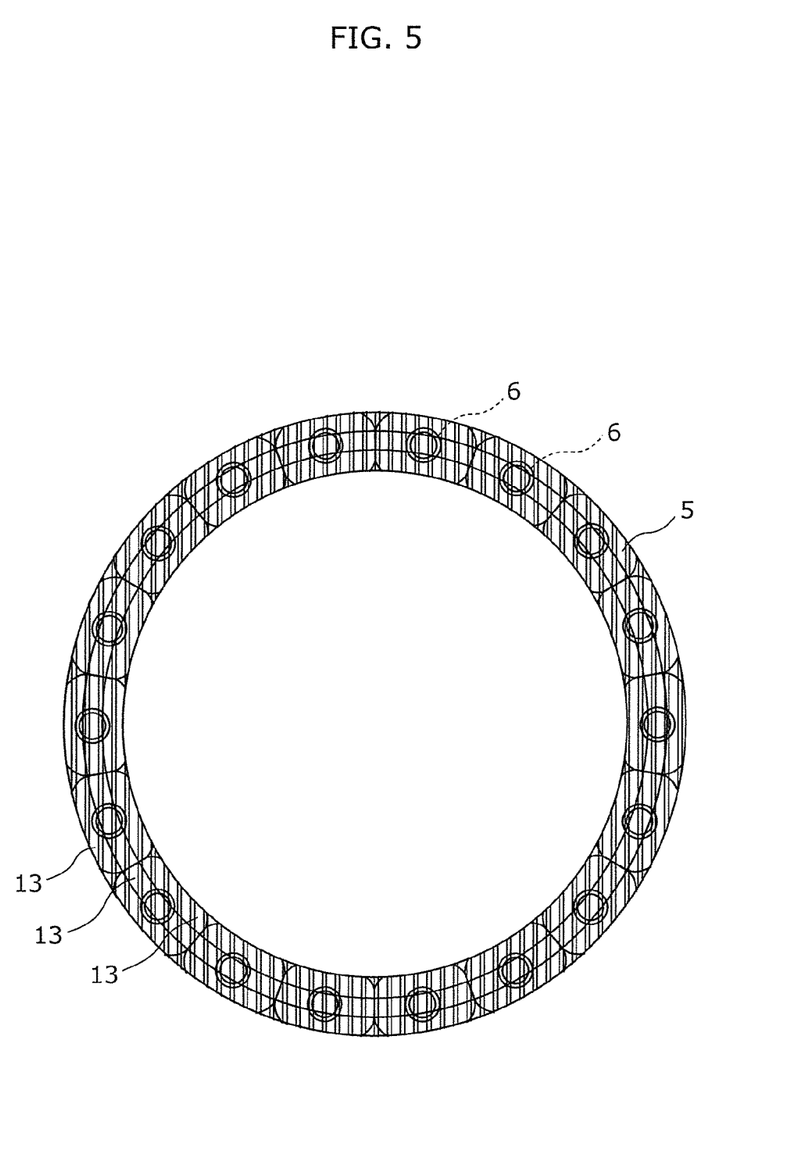
FIG. 5 is a back view of a light guide in the lighting apparatus according to Embodiment 1.
Figure 6:
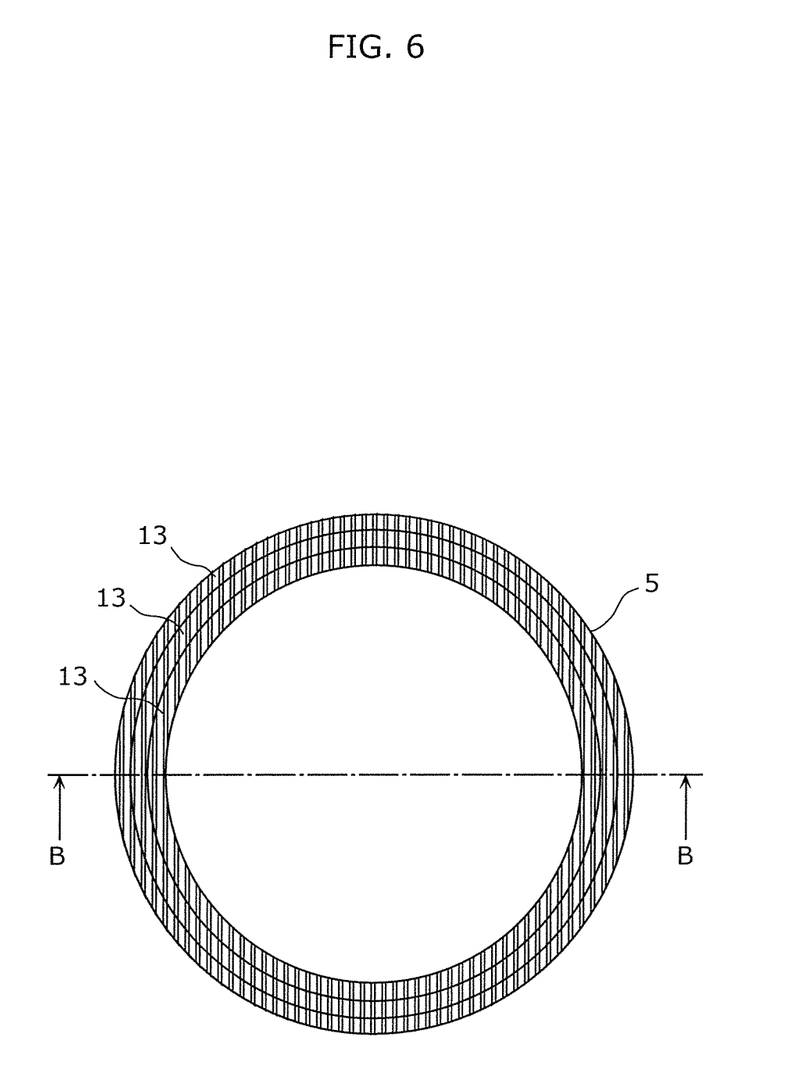
FIG. 6 is a front view of the light guide in the lighting apparatus according to Embodiment 1.
Figure 7:
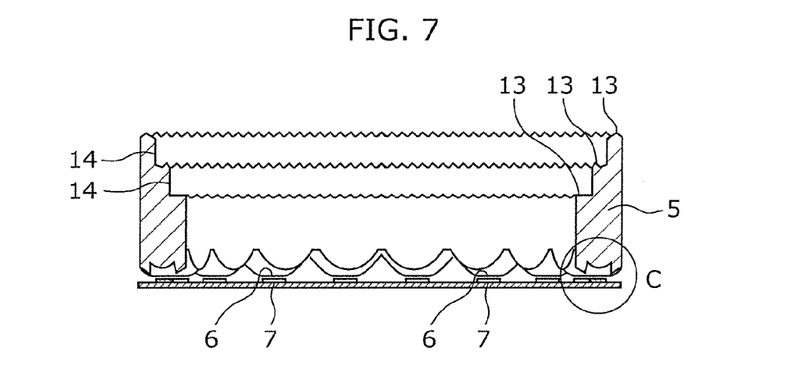
FIG. 7 is a cross-sectional view of the light guide and light-emitting modules in the lighting apparatus according to Embodiment 1 at line B-B in FIG. 6.
Figure 8:
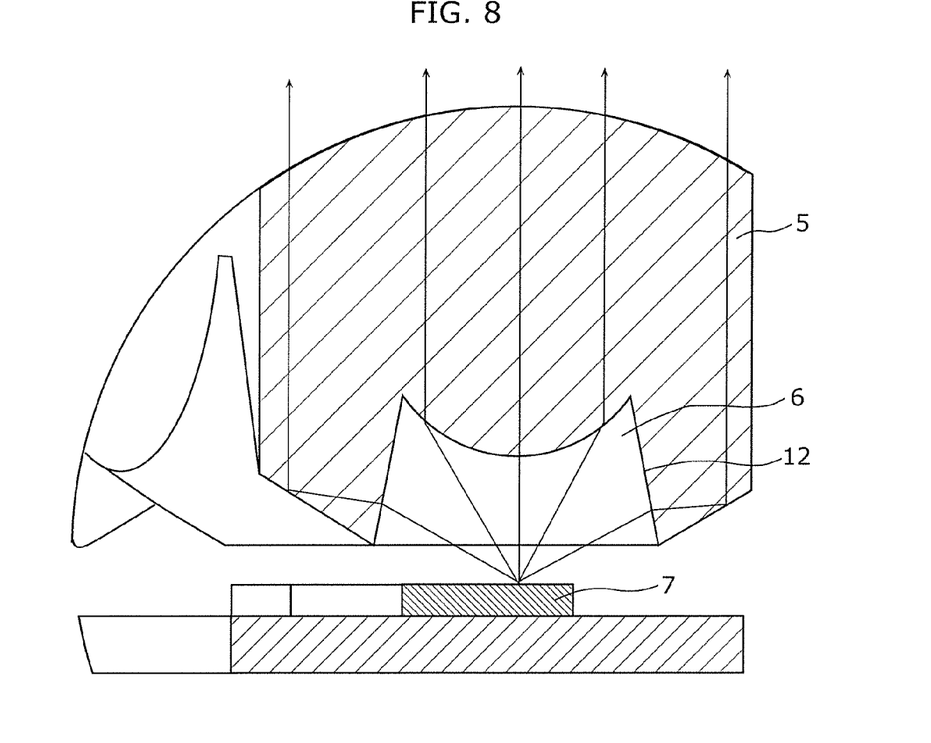
FIG. 8 is an enlarged cross-sectional view of portion C in FIG. 7.

Hereinafter, the detailed configuration of the light guide 5 and the light sources 7 in the lighting apparatus 4 will be described using FIG. 5 to FIG. 8. FIG. 5 is a back view of the light guide in the lighting apparatus according to Embodiment 1, and illustrates the light guide when viewed from the light entry side. FIG. 6 is a front view of the light guide in the lighting apparatus, and illustrates the light guide when viewed from the light exit side. Furthermore, FIG. 7 is a cross-sectional view of the light guide and light-emitting modules in the lighting apparatus at line B-B in FIG. 6; and FIG. 8 is an enlarged cross-sectional view of portion C in FIG. 7.

The light guide 5 is a tubular body having a substantially cylindrical overall shape, and is, for example, integrally molded from a synthetic resin having a light-transmitting property.

The first end of the light guide 5 is the light entry side, and, as illustrated in FIG. 5, plural light entry portions 6 are formed in the first end of the light guide 5. As illustrated in FIG. 7 and FIG. 8, the light sources 7 are arranged opposite the light entry portions 6.

In this embodiment, plural light entry portions 6 are formed at uniform intervals in the first end of the light guide 5, and plural light sources 7 are provided corresponding to the respective light entry portions 6. Specifically, as illustrated in FIG. 5, 18 of the light entry portions 6 arranged in a ring-shape are formed in the first end of the light guide 5, and the light sources 7 are arranged opposite the light entry portions 6 on a one-to-one basis.

As illustrated in FIG. 8, each of the light entry portions 6 includes a light redirecting portion 12 which changes the traveling direction of light entering the light guide 5 from the corresponding light source 7 to a direction that is substantially parallel to the tube axis direction of the light guide 5. The light redirecting portion 12 is a lens portion having a lens effect of changing the traveling direction of light. The light redirecting unit 12 is a projection having a substantially circular truncated cone shape and an outer diameter that gradually increases from the light entry side toward the light exit side. A recess is formed in the projection, at a position opposite the light source 7. The outer face of the light redirecting portion 12 (projection) is a curved face or a sloped face. The bottom face of the recess is a curved face formed projecting toward the light source 7 side, and the lateral face of the recess is a sloped face formed surrounding the bottom face.

The sloped faces and the curved faces in the light redirecting portion 12 can be formed at the same time when the light guide 5 is integrally molded from a synthetic resin.

On the other hand, the second end of the light guide 5 is the light exit side and, as illustrated in FIG. 6 and FIG. 7, includes plural ring-shaped light-emitting faces 13 formed concentrically in the second end in the tube axis direction of the light guide 5, and wall-like non light-emitting faces 14 formed along the tube axis direction of the light guide 5 at the border of adjacent light-emitting faces 13.

In this embodiment, the light-emitting faces 13 are shaped like rings each of constant width, and are formed concentrically. As one example, all the light-emitting faces 13 have the same width. Furthermore, the light-emitting faces 13 are formed in steps (i.e., having differences in level). The non light-emitting faces 14 are vertical wall faces that make up the difference in level between adjacent ones of the light-emitting faces 13. In this embodiment, plural non light-emitting faces 14 are formed. Each of the non light-emitting faces 14 is a cylindrical face of constant height.

Each of the light sources 7 is a first light source and is, for example, a light-emitting diode (LED) light source consisting of LEDs. The light source 7 is, for example, a white LED light source, and, for example, may emit white light by using a yellow phosphor and a blue LED chip that emits blue light or may emit white light by using LED chips that respectively emit blue light, red light, and green light. It should be noted that the light source 7 is not limited to emitting white light, and may emit orange light, etc.

In this embodiment, the plural light sources 7 are mounted in a ring-like arrangement on a ring-shaped substrate (mounting board). Each of the light sources 7 is a light-emitting device of the surface mount device (SMD) type in which at least one LED chip (bare chip) is mounted inside a resin container and sealed using a sealing component (for example, a resin containing a phosphor). In this case, an LED module is composed of the substrate and the plural light sources 7.

It should be noted that the light source 7 may be the LED chip itself. In this case, a chip on board (COB)-type LED module is configured by directly mounting an LED chip on a substrate and sealing the LED chip using a sealing component (for example a resin containing a phosphor).

The light source 9 is a second light source and is, for example, an LED light source. As an example, the light source 9 is a white LED light source and can have the same configuration as the light source 7.

As described above, according to the lighting apparatus 4 according to this embodiment, the light redirecting portions 12, which change the travel direction of light entering from the light sources 7 to a direction that is substantially parallel to the tube axis direction of the light guide 5, are provided in the first end of the light guide 5, and the ring-shaped light-emitting faces 13 are formed concentrically in the second end of the light guide 5. In addition, the vertical wall-like non light-emitting faces 14 are formed along the tube axis direction of the light guide 5, at the borders of adjacent light-emitting faces 13.

With this, light entering the light guide 5 from the light sources 7 is made to travel in a direction parallel to the tube axis direction of the light guide 5 by the light redirecting portion 12, and is emitted from the concentric light-emitting faces 13.

In this case, since the vertical wall-like non light-emitting faces 14 are provided between the light-emitting faces 13, light is emitted only from the light-emitting faces 13. As such, the concentric light-emitting faces 13 become three-dimensional light-emitting faces.

Figure 9:
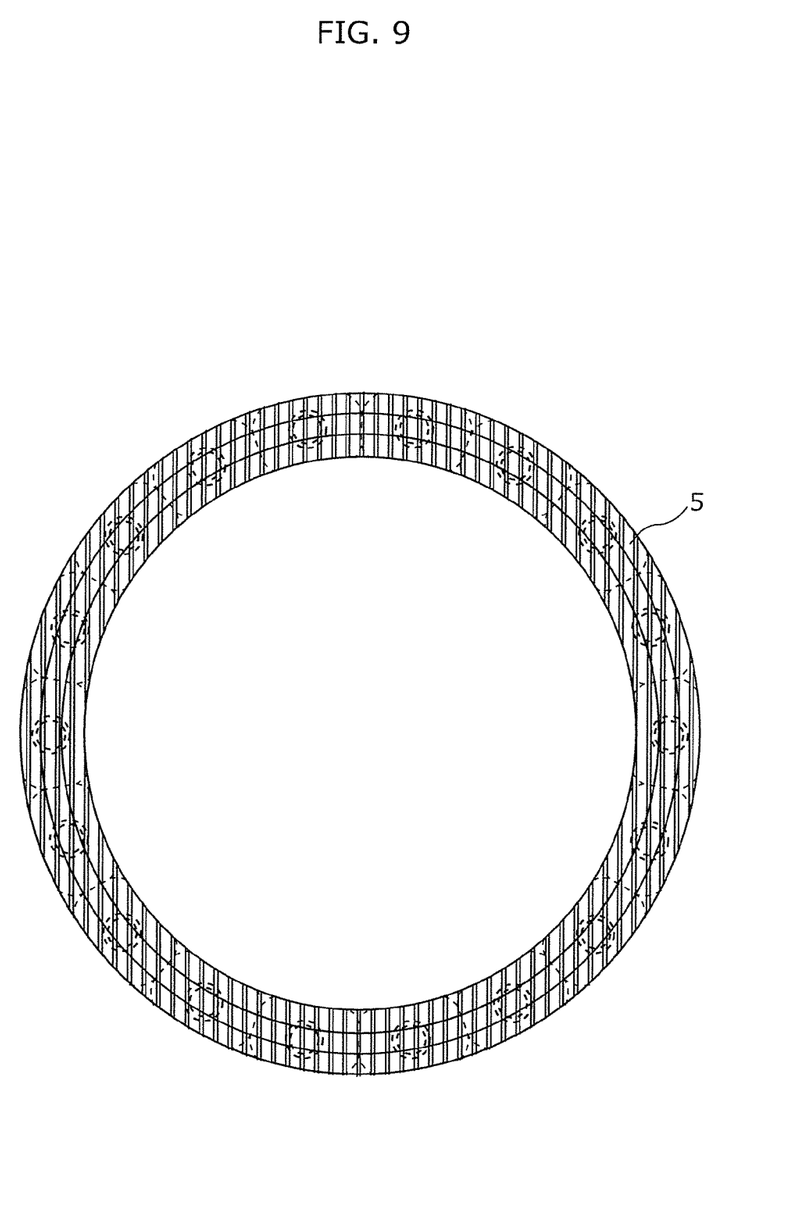
FIG. 9 is a front view of the light guide in the lighting apparatus according to Embodiment 1.
Figure 10:
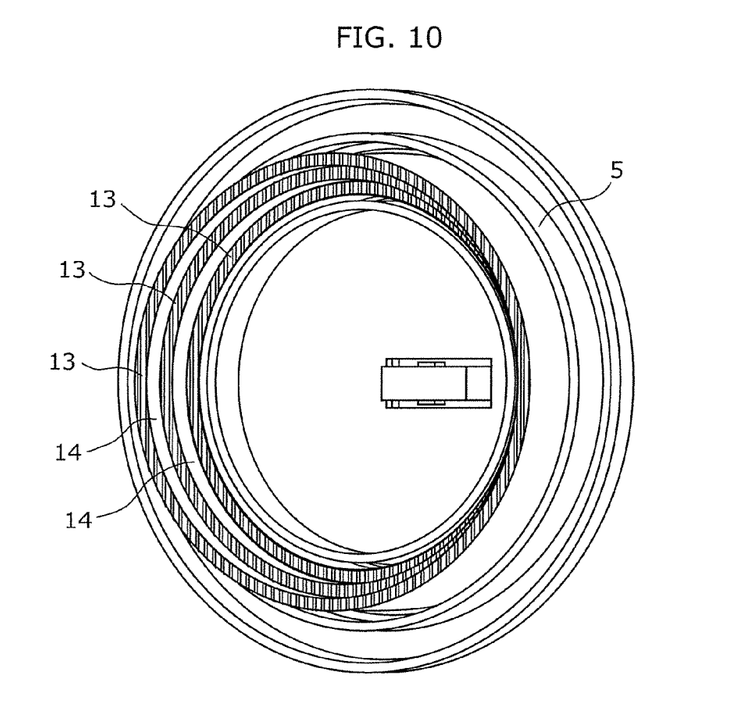
FIG. 10 is a perspective view of the light guide in the lighting apparatus according to Embodiment 1.
Figure 11:
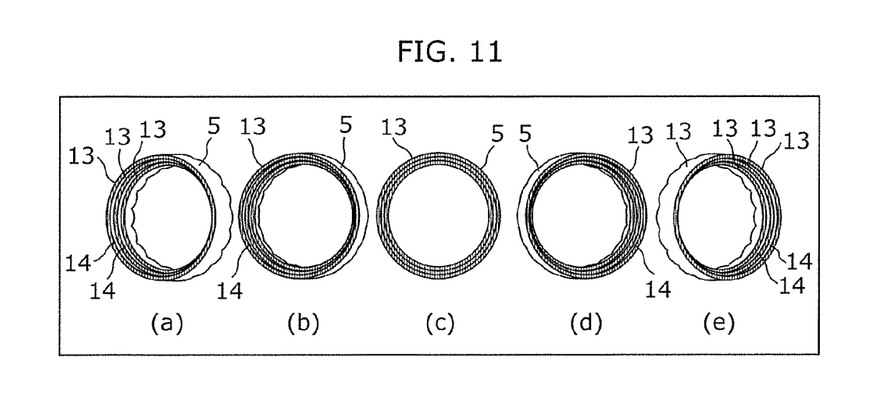
FIG. 11 is a diagram illustrating tilted states of the light guide in the lighting apparatus according to Embodiment 1.

Specifically, due to the presence of the vertical wall-like non light-emitting faces 14 between the light-emitting faces 13, as illustrated in FIG. 9 to FIG. 11, the light emitting pattern is different when the lighting apparatus 4 is viewed from the front (FIG. 9 and (c) in FIG. 11) and when the lighting apparatus 4 is viewed at an angle (FIG. 10 and (a), (b), (d), (e) in FIG. 11). When a person looks at the lighting apparatus 4, the portion indicated as the above-described light-emitting pattern shines brilliantly as a light emission brightness face. Therefore, the turned-ON lighting apparatus 4 can be seen with different light-emitting patterns depending on the viewing angle.

Further describing FIG. 11, when the turned-ON lighting apparatus 4 is viewed from the front ((c) in FIG. 11), the concentric light-emitting faces 13 are recognized as a single ring-shaped light-emitting pattern in which the light-emitting faces 13 are aligned without gaps.

On the other hand, when the lighting apparatus 4 is viewed from the right for example, the appearance of the lighting apparatus 4 changes from that in (c) to those in (b) and (a). In this case, the concentric light-emitting faces 13 and the non light-emitting faces 14 in between the light-emitting faces 13 look three-dimensional in the portion on the left side of the lighting apparatus 4. Therefore, in this case, the turned-ON lighting apparatus 4 is recognized as a light-emitting pattern in which the light-emitting faces 13 (light-emitting regions) and the non light-emitting faces 14 (non light-emitting regions) are joined alternately.

Conversely, when the lighting apparatus 4 is viewed from the left, the appearance of the lighting apparatus 4 changes from that in (c) to those in (d) and (e). In this case, the concentric light-emitting faces 13 and the non light-emitting faces 14 in between the light-emitting faces 13 look three-dimensional in the portion on the right side of the lighting apparatus 4. Therefore, in this case too, the turned-ON lighting apparatus 4 is recognized as a light-emitting pattern in which the light-emitting faces 13 (light-emitting regions) and the non light-emitting faces 14 (non light-emitting regions) are joined alternately.

In this manner, the light-emitting pattern of the lighting apparatus 4 changes with just a slight change in the direction in which the lighting apparatus 4 is viewed. This makes it possible to create a heightened awareness of the presence of the lighting apparatus 4 among pedestrians and drivers of other automobiles. As a result, the level of safety when the automobile 1 is moving can be raised.

Embodiment 2

Figure 12:
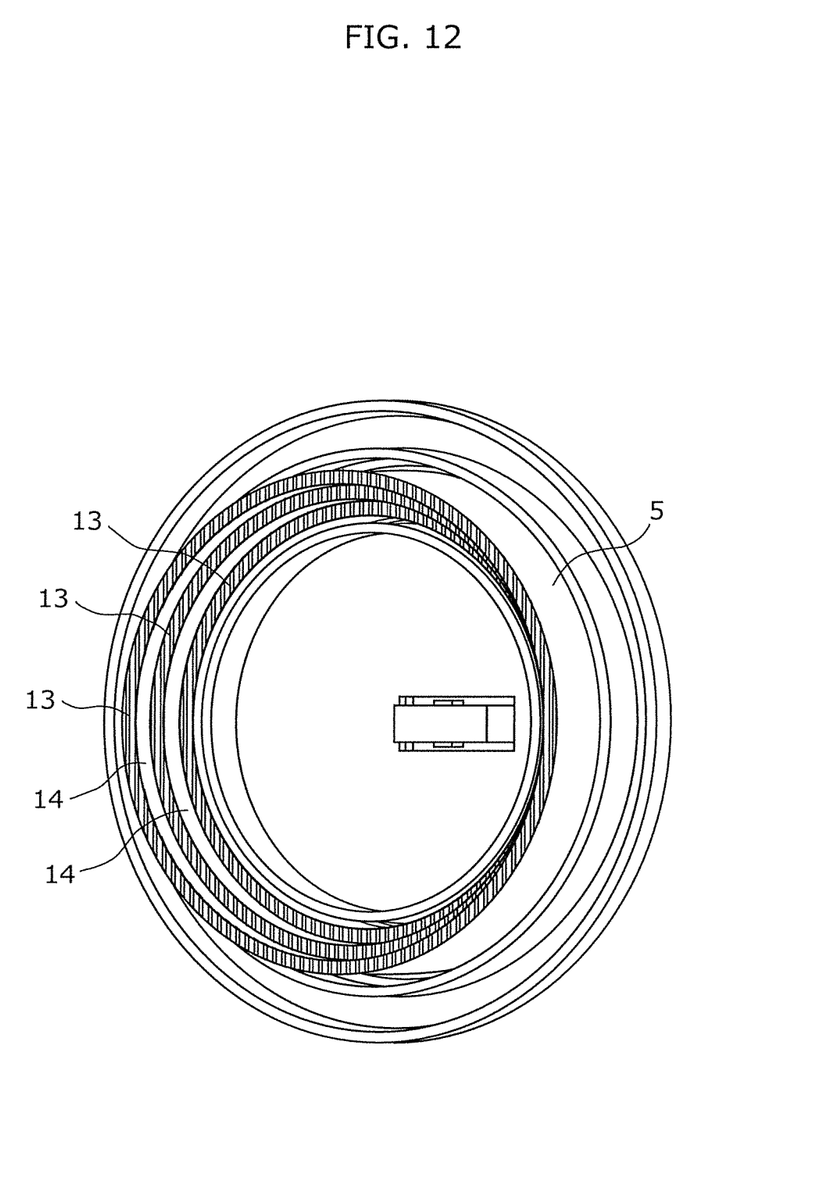
FIG. 12 is a perspective view of a lighting apparatus according to Embodiment 2.

FIG. 12 is a perspective view of a lighting apparatus according to Embodiment 2.

Whereas the light-emitting faces 13 have the same width in Embodiment 1, in this embodiment, the light-emitting faces 13 have mutually different widths, as illustrated in FIG. 12. In other words, the widths of the light-emitting faces 13 may be made different from one another.

For example, between a first light-emitting face (an inner light-emitting face) and a second light-emitting face (an outer light-emitting face) positioned outward of the first light-emitting face, of the plural light-emitting faces 13, the first light-emitting face may have a width that is greater than the width of the second light-emitting face or the first light-emitting face may have a width that is less than the width of the second light-emitting face. In other words, an inner one of the light-emitting faces 13 may be wider than an outer one of the light-emitting faces 13, or, as illustrated in FIG. 12, an inner one of the light-emitting faces 13 may be narrower than an outer one of the light-emitting faces 13.

Embodiment 3

Figure 13:
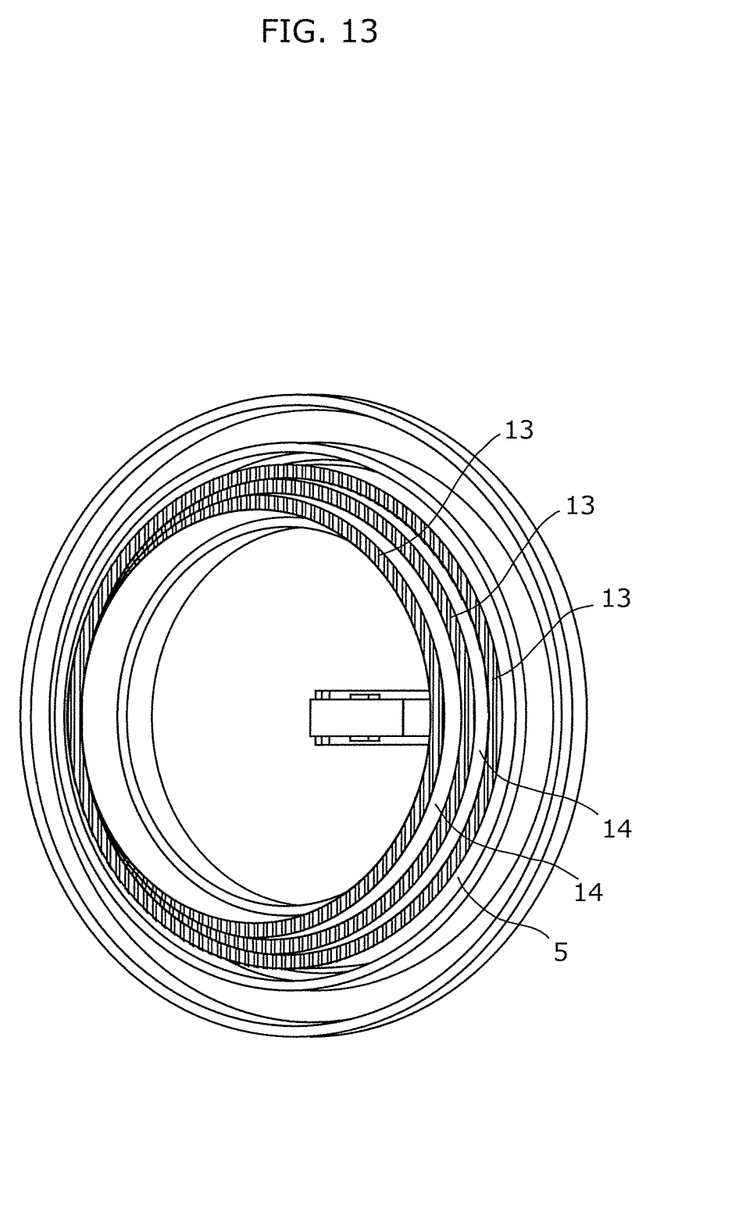
FIG. 13 is a perspective view of a lighting apparatus according to Embodiment 3.

FIG. 13 is a perspective view of a lighting apparatus according to Embodiment 3.

Whereas a stepped shape in which an outer one of the light-emitting faces 13 is located further forward than an inner one of the light-emitting faces 13 is shown in Embodiment 1, in this Embodiment, the reverse is shown. In other words, as illustrated in FIG. 13, a stepped shape in which an inner one of the light-emitting faces 13 is located further forward than an outer one of the light-emitting faces 13 may be adopted.

Modifications

Although the lighting apparatus, automobile, etc. according to the present invention are described based on exemplary embodiments, the present invention is not limited to these exemplary embodiments.

For example, although the lighting apparatus 4 is provided at the front of the vehicle body 2 in the foregoing embodiments, the lighting apparatus 4 may be provided at the back of the vehicle body 2 or at both the front and the back of the vehicle body 2. In other words, it is sufficient that the lighting apparatus 4 is disposed in at least one of the front and the back of the vehicle body 2.

Furthermore, although the automobile is exemplified by a four-wheeled automobile in the foregoing embodiments, other automobiles such as a two-wheeled automobile (motorbike) are also acceptable.

Furthermore, although LEDs are used for the light sources 7 and 9 in the forgoing embodiments, a solid-state light-emitting device other than an LED may be used. Furthermore, the light sources 7 and 9 are not limited to an LED light source, and existing lamps may be used.

Forms obtained by various modifications to the exemplary embodiments and modifications that can be conceived by a person of skill in the art as well as forms realized by arbitrarily combining structural components and functions in the exemplary embodiments and modifications which are within the scope of the essence of the present invention are included in the present invention.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting apparatus comprising:
    a light guide which is tubular and includes a light entry portion in one end in a tube axis direction; and
    a first light source arranged corresponding to the light entry portion,
    wherein the light entry portion includes a light redirecting portion which changes a traveling direction of light entering from the first light source to a direction that is substantially parallel to the tube axis direction of the light guide, and
    the light guide includes:
    a plurality of light-emitting faces which are ring-shaped and formed concentrically in an other end in the tube axis direction of the light guide; and
    a non light-emitting face which is wall-like and formed along the tube axis direction of the light guide, at a border of adjacent ones of the plurality of light-emitting faces.

2. The lighting apparatus according to claim 1,
    wherein a plurality of the light entry portions are formed at uniform intervals in the one end of the light guide, and
    a plurality of the first light sources are arranged in one-to-one correspondence with the plurality of the light entry portions.

3. The lighting apparatus according to claim 1,
    wherein the light guide is cylindrical, and
    the plurality of light-emitting faces are formed concentrically.

4. The lighting apparatus according to claim 1,
    wherein the plurality of light-emitting faces have the same width.

5. The lighting apparatus according to claim 1,
    wherein the plurality of light-emitting faces have different widths.

6. The lighting apparatus according to claim 5,
    wherein the plurality of light-emitting faces include a first light-emitting face and a second light-emitting face located outward of the first light-emitting face, and
    the first light-emitting face is wider than the second light-emitting face.

7. The lighting apparatus according to claim 5,
    wherein the plurality of light-emitting faces include a first light-emitting face and a second light-emitting face located outward of the first light-emitting face, and
    the first light-emitting face is narrower than the second light-emitting face.

8. The lighting apparatus according to claim 1, further comprising:
    a reflecting mirror which is cup-shaped and disposed inward of the light guide; and
    a second light source disposed at a center portion of the reflecting mirror.

9. The lighting apparatus according to claim 8, further comprising:
    a cover covering an outer periphery of the other end of the light guide; and
    a case covering an outer periphery of the one end of the light guide.

10. An automobile comprising:
    the lighting apparatus according to claim 1; and
    a vehicle body,
    wherein the lighting apparatus is disposed in at least one of a front and a back of the vehicle body.

11. The lighting apparatus according to claim 2,
    wherein the plurality of the light entry portions are arranged in a ring in the one end of the light guide.

* * * * *